United States Patent
Puzicha et al.

(10) Patent No.: US 8,024,333 B1
(45) Date of Patent: Sep. 20, 2011

(54) SYSTEM AND METHOD FOR PROVIDING INFORMATION NAVIGATION AND FILTRATION

(75) Inventors: Jan Puzicha, Bonn (DE); Thomas Hofmann, Zollikon (CH)

(73) Assignee: Recommind, Inc., San Francisco, CA (US)

(*) Notice: Subject to any disclaimer, the term of this patent is extended or adjusted under 35 U.S.C. 154(b) by 0 days.

(21) Appl. No.: 12/641,118

(22) Filed: Dec. 17, 2009

Related U.S. Application Data (63) Continuation of application No. 11/653,059, filed on Jan. 12, 2007, now Pat. No. 7,657,522.

(60) Provisional application No. 60/758,900, filed on Jan. 12, 2006.

(51) Int. Cl.
*G06F 17/30* (2006.01)

(52) U.S. Cl. ........ 707/728; 707/749; 707/752; 707/754; 709/203

(58) Field of Classification Search .............. 707/749, 707/752, 769, 723, 728, 754; 709/201, 203
See application file for complete search history.

(56) References Cited

U.S. PATENT DOCUMENTS

| | | | | |
|---|---|---|---|---|
| 5,862,325 | A * | 1/1999 | Reed et al. | 709/201 |
| 6,233,575 | B1 * | 5/2001 | Agrawal et al. | 707/749 |
| 6,539,375 | B2 * | 3/2003 | Kawasaki | 707/728 |
| 6,757,710 | B2 * | 6/2004 | Reed | 709/203 |
| 6,999,962 | B2 * | 2/2006 | Julliard et al. | 707/769 |
| 7,143,089 | B2 * | 11/2006 | Petras et al. | 707/749 |
| 7,657,522 | B1 * | 2/2010 | Puzicha et al. | 707/723 |
| 7,747,631 | B1 | 6/2010 | Puzicha et al. | |
| 2001/0047290 | A1 * | 11/2001 | Petras et al. | 705/10 |
| 2002/0095454 | A1 * | 7/2002 | Reed et al. | 709/201 |
| 2002/0107853 | A1 * | 8/2002 | Hofmann et al. | 707/752 |
| 2003/0217052 | A1 * | 11/2003 | Rubenczyk et al. | 707/769 |
| 2006/0020942 | A1 * | 1/2006 | Ly et al. | 718/100 |

OTHER PUBLICATIONS

"Cooper et al., OBIWAN-a visual interface for prompted query refinement, Jan. 6-9, 1998, IEEE, vol. 2, 277-285."
Xu et al., Query expansion using local and global document analysis, Aug. 1996, ACM, 4-11.

* cited by examiner

*Primary Examiner* — Shahid A Alam
(74) *Attorney, Agent, or Firm* — Carr & Ferrell LLP (57) ABSTRACT

A system and method for information navigation and filtration is provided. One or more query terms are received from a user. A preliminary relevance of one or more objects associated with an enterprise system is determined based on the query terms. The preliminary relevance may be propagated between objects. At least one rating is assigned to the one or more objects based on the preliminary relevance. An overall relevance of the one or more objects is established based on the at least one rating. The one or more objects are ranked according to the overall relevance. Data is provided as search results comprised of the one or more objects according to the ranking to the user. The search results may then be filtered based on at least one selected, dynamically generated filter. The filtered search results may be dynamically generated and provided to the user.

20 Claims, 7 Drawing Sheets

MORRISON | FOERSTER

○ NEW SEARCH

4556 Documents

○ Search = motion to compel arbitration

◀ Back | 1-20 ▼ | Next ▶ Sort ○ Relevance ▼

Preview

| | |
|---|---|
| Document Number | motion to compel USE THIS .doc SF-2345567 v.1 — 310 |
| Document Type | Bosso, John E. edited last on October 14, 2005 |
| Application | Bosso, John E. authored on October 13, 2005 |
| Author | Client/Matter LEGAL LEARNING CORP. > USTECH INC (10000-1) |
| Author's Office | Document Type Pleadings, Complaints, Petitions, Motions, Answers, Demurrer |

STATE OF CALIFORNIA PLACER COUNTY DISTRICT COURT FOURTH JUDICIAL DISTRICT USTech, Inc. USA.Com, L.L.C., and DBA, Inc. d/b/a/ USTech Visual Systems... ...Legal Learning Corporation's Motion to Compel Arbitration and to Stay or... ...in Support of Motion to Compel Arbitration and to Stay or... ...satisfied, the Court must compel arbitration and lacks discretion to do... ...determines that an order compelling arbitration is proper, the court must...... their entirety; or, alternatively, compelling arbitration of those claims as well...

312 — notes re motion to compel hearing .doc SF-1919191 v.1 — 314

| | |
|---|---|
| Author's Role | Litigation — 878 |
| Author's Department | Corporate — 669 |
| Created by | Healthcare & Life Sciences — 434 — 316 |
| Edited by | Real Estate — 230 |
| Used by | Labor — 148 |
| Matter Billing Attorney | Financial Transactions Group — 129 |
| Matter Responsible Attorney | Secretaries - Other Legal — 106 |
| Client Name | Land Use/Environmental — 83 |
| Client Industry | Tax — 66 |
| Client Sub Industry | Financial Services — 26 |
| Matter Name | |
| Matter Practice | |
| Matter Type of Law | |

...urt prioritized class discovery we responded to majority of requests, including requests solely related to merit FA...... have seen their class cert. motions...and there is nothing related...not described accurately in motion ective Order .doc SF-1929192 v.1 — 318

SIDIO (99933-2)

overy of material that is completely irrelevant to any matter in this case. This case involves the City's breach of ...approving......In Support Of City's Motion To Compel ("City's MPA") p. 7)... actions and the City's Motion to Compel an inspection of the......the City sought a Motion to Compel inspection. (Decl...........North Village objected......justification to bring a motion to compel discovery of irrelevant material...... of this action. This Motion to Compel is another attempt by...

Answer to Petition to Compel Arbitration - as submitted to USDC PDQ 9/12/2005 .pdf SF-2004602 v.1

Tabnin, Serge E. edited last on September 21, 2005
Chillaz, Barbara authored on September 21, 2005
Client/Matter SMARTCOMPANY, LTD. > GREENFIELDS (42225-1)
Document Type Pleadings, Complaints, Petitions, Motions, Answers, Demurrer 1 2 3 4 5 6 ...ANSWER TO PETITION TO COMPEL ARBITRATION AND AFFIRMATIVE DEFENSE...to the Petition to Compel Arbitration and to Enjoin Respondent From Petition to Compel arbitration which arise from Greenfields... ANSWER TO PETITION TO COMPEL ARBITRATION AND AFFIRMATIVE DEFENSE ANSWER TO PETITION TO

SYSTEM AND METHOD FOR PROVIDING INFORMATION NAVIGATION AND FILTRATION

CROSS-REFERENCE TO RELATED APPLICATIONS

The present application is a continuation application and claims the priority benefit of U.S. patent application Ser. No. 11/653,059 filed on Jan. 12, 2007, now U.S. Pat. No. 7,657, 522, titled "System and Method for Providing Information Navigation and Filtration," which claims the priority benefit of U.S. Provisional Patent Application No. 60/758,900, filed Jan. 12, 2006 and entitled "Information Navigation and Filtration in an Enterprise Search System," all of which are incorporated by reference. The present application is also related to U.S. patent application Ser. No. 11/653,136, filed Jan. 11, 2007, and entitled "System and Method for Establishing Relevance of Objects in an Enterprise System," which is also incorporated by reference.

BACKGROUND OF THE INVENTION

1. Field of the Invention

The present invention relates generally to search systems, and more particularly to a system and method for providing information navigation and filtration.

2. Description of Related Art

Conventionally, a variety of searches may be performed utilizing search systems. Keyword searches may be performed, for example. Searches may be performed to search for subject matter, authors, and so forth, as well.

In order to retrieve data, a search engine generally performs key word searches. Documents and other content including the key words are then returned to a user.

Various search engines rank results of the various content including the key words. Accordingly, the content is ordered according to the ranked results for the user.

Because key word searches often return a voluminous collection of content based on the key words in the content, other types of searches are sometimes performed.

SUMMARY OF THE INVENTION

A system, method, and computer program for providing information navigation and filtration in an enterprise system is provided. In a method according to one embodiment, one or more query terms are received from a user. A preliminary relevance of one or more objects associated with an enterprise system is determined based on the query terms. At least one rating is assigned to the one or more objects based. On the preliminary relevance. In some embodiments, the preliminary relevance may be propagated between the one or more objects. An overall relevance of the one or more objects is established. The one or more objects may be ranked according to the overall relevance. Data is provided as search results comprising the one or more objects according to the ranking to the user.

The search results may be filtered based on dynamically generated filters. These dynamically generated filters may be based on the preliminary relevance associated with the one or more objects and/or relationships inferred between the objects. The preliminary relevance represents relationships between the one or more objects according to exemplary embodiments. Based on the selected dynamically generated filter, a dynamic search result display may be presented to the user.

BRIEF DESCRIPTION OF THE DRAWINGS

FIG. 3a illustrates a screen shot of an exemplary search results page;

FIG. 3b illustrates a screen shot of the exemplary search results page having a filter selection window;

FIG. 3c illustrates a screen shot of an exemplary filtered search results page;

DESCRIPTION OF EXEMPLARY EMBODIMENTS

Information navigation and filtration within an enterprise system is provided for narrowing search results. A query related to one or more objects is received. A preliminary relevance to the query is computed for the one or more objects based on at least one term associated with the query and may also be based on one or more metadata associated with the one or more objects. In some embodiments, the preliminary relevance is then propagated between the one or more objects, and an overall relevance is obtained based on the propagation. Search results are displayed in response to the query.

The search results may be filtered based on the preliminary relevance associated with the one or more objects. Accordingly, the search results may be narrowed by leveraging the preliminary relevance associated with the one or more objects comprising the search results. Searches may be performed in an enterprise system, and search results may be returned based on different classes, types, and so forth associated with the one or more objects. The preliminary relevance represents relationships between the one or more objects according to exemplary embodiments. Also, systems and methods described herein may be accomplished utilizing a computer readable storage medium having a program, the program being executable by a processor to perform such methods. Such a program may include executable instructions which may be stored onto memory in one or more computing devices.

Figure 1:
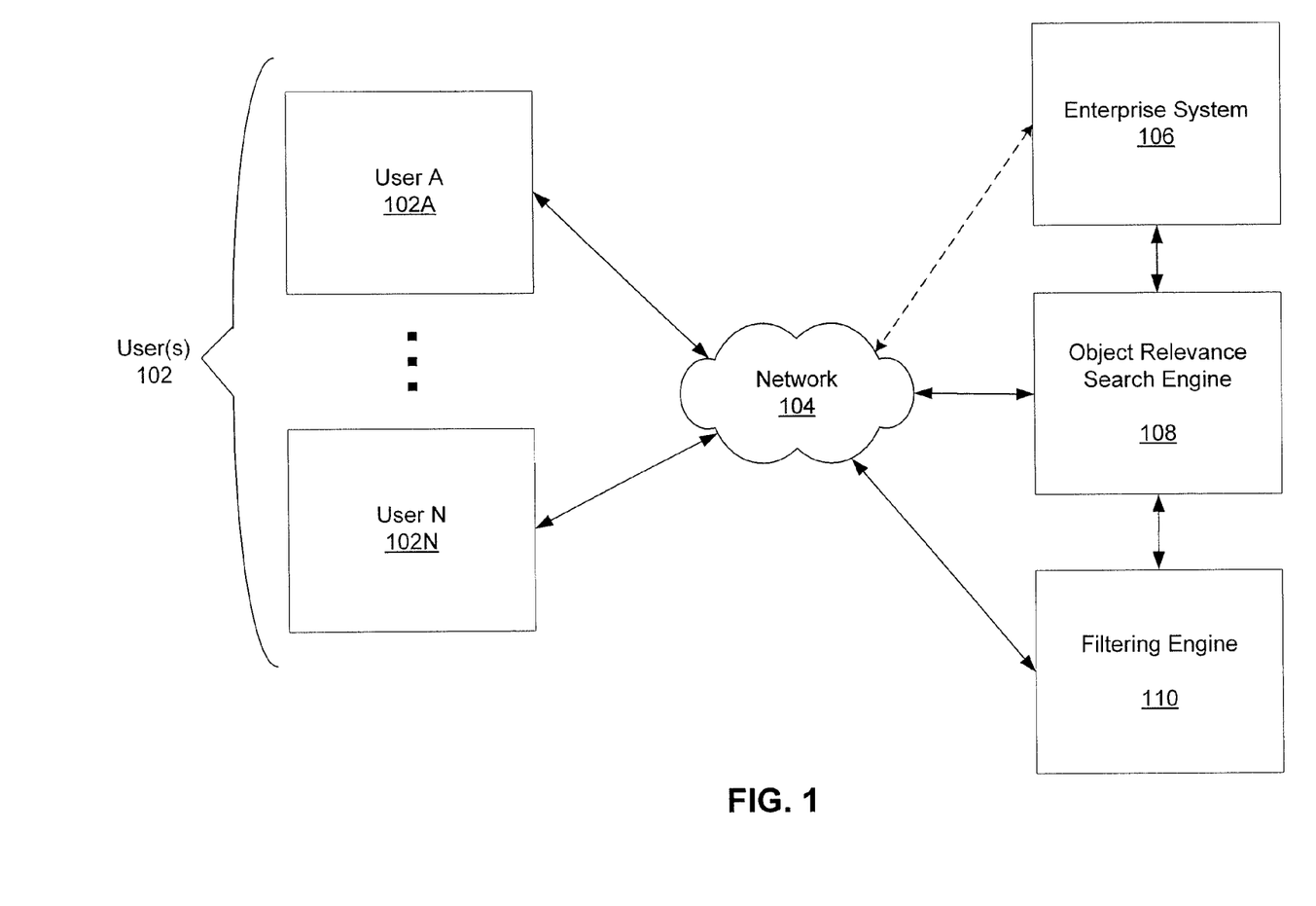
FIG. 1 illustrates a schematic diagram of an exemplary environment for providing data based on object relevance.

Referring now to FIG. 1, a schematic diagram of an exemplary environment for providing information navigation and filtration within an enterprise system is illustrated. A user A 102A through a user N 102N communicate via a network 104 with an enterprise system 106. The user A 102A through the user N 102N may communicate with any type of enterprise system 106. The network 104 may include, for example, the Internet, an Intranet, or any other type of network.

The enterprise system 106 may include any type of data or content, such as various documents and/or media that the users 102, such as the user A 102A through the user N 102N, can access. For example, in a law firm, the users 102 can access content comprising any number of legal documents, letters, briefs, articles, and so forth that various members of the law firm generate. Typically, the users 102 can search for the data or the content associated with the enterprise system 106 in order to retrieve the various documents, media, and so forth. The enterprise system 106 may be comprised of one or more servers, computing devices, and/or databases that process and/or store the data.

An object relevance search engine 108 is coupled to the enterprise system 106. According to some embodiments, the enterprise system comprises the object relevance search engine 108. The users 102 can interface directly with the object relevance search engine 108 according to exemplary embodiments. Accordingly, the users 102 can search for the data associated with the enterprise system 106 via the object relevance search engine 108. The object relevance search engine 108 performs various functions with one or more objects used to represent the data associated with the enterprise system 106. Thus, the data provided to the users 102 in response to a query may be based on object relevance, rather than, or in addition to, standard key word searches, for example. Alternatively, the users 102 can search for data directly via the enterprise system 106, such as by performing key words searches via a search interface associated with the enterprise system 106.

In exemplary embodiments, the object relevance search engine 108 receives a query from at least one user 102. The query may be related to one or more objects. The objects may include people, matters, documents, and so forth. Each object may include various data and/or metadata. In some embodiments, the objects, such as virtual objects, are created for each matter, person, client, and so forth. However, the objects may be generated in response to the query according to various embodiments.

The object relevance search engine 108 can access the objects, or any other data, from one or more databases (not shown) or other information repositories. The object relevance search engine 108 computes a preliminary relevance for the one or more objects based on one or more terms associated with the query. For example, in a query for people having experience in "corporate governance", objects including the keywords "corporate" and/or "governance" may be deemed relevant by the object relevance search engine 108. The metadata associated with each of the objects may also be accessed for computing the preliminary relevance. For instance, a metadata tag for particular objects may indicate that "corporate governance" is associated with "Sarbanes Oxley." Accordingly, people with experience with Sarbanes Oxley may be deemed relevant, even though corporate governance does not specifically appear in documents authored by these people, in biographies about these people, and so forth. Both terms associated with the query and metadata may be utilized in computing relevancy for the objects or they may be utilized singularly for relevancy computation according to some embodiments.

In some embodiments, the object relevance search engine 108 propagates the preliminary relevance between the objects. Thus, various objects may be linked by the preliminary relevance computation via transitive properties associated with the various objects. Transitive properties include relationships between the objects. In other words, the relationship between three objects is such that if the relationship holds between a first object and a second object and between the second object and a third object, the relationship necessarily holds between the first object and the third object. Thus, the transitive properties may be utilized to infer relationships between the various objects. The propagation of the preliminary relevance and the relationships inferred may be used by the filtering engine 110 to dynamically derive filters and generate a dynamic display of search results based on a selected filter by the user 102A.

Continuing with the corporate governance example, if a "John Smith" worked on matters having to do with Sarbanes Oxley and a "Jane Jones" co-authored a variety of documents with John Smith, then Jane Jones may also be deemed to be an expert in the area of corporate governance by the information processing engine 104 because the preliminary relevance is propagated between a "John Smith object" and a "Jane Smith object." Any type of data or relevancy may be propagated between the objects. Accordingly, various people not directly associated with the keywords "corporate governance" may be returned as experts in the corporate governance area.

Once the object relevance search engine 108 computes and propagates the preliminary relevance, the object relevance search engine 108 determines an overall relevance and ranks the search results according to the overall relevance. For example, in the corporate governance query scenario, Jane Smith may be ranked higher than John Smith because Jane Smith works in a corporate practice group, while John Smith works in a patent practice group.

Any type of weighting, relevancy, and so forth may be assigned to the objects and/or the search results. In exemplary embodiments, the objects may be grouped into virtual domains, such as practice groups, departments, seniority, and so forth. In some embodiments, the virtual domains may represent classes, types, and so forth associated with the one or more objects, as discussed herein. The virtual domains may be weighted according to the query and the objects comprising each of the virtual domains may be further weighted within the virtual domains, the virtual domains' weights affecting the object weights within each of the virtual domains. However, any type of weighting is within the scope of various embodiments.

The search results may then be displayed to the user including one or more links to the relevant search results. The user may view the search results in various categories, such as the virtual domains, by key word, and so forth. Any type of categories may be utilized for displaying the search results according to various embodiments.

The various types of data may be represented by one or more objects, as discussed herein. The object relevance search engine 108 may perform various functions with the data, as discussed herein, such as assigning the one or more objects to represent people, matters, documents, and so forth that comprise the data. The object relevance search engine 108 assigns one or more ratings to the objects, such as relevancy, connection strengths, and domain weights.

The object relevance search engine 108 may also assign connection strengths between the one or more objects that indicate the strength of transitive properties, or relationships, between the one or more objects. The object relevance search engine 108 may also assign weights to the one or more objects based on domains to which the objects are assigned. For example, an object may belong to one or more Virtual domains, such as a management personnel domain, a corporate department domain, and so forth. The relevancies, the connection strengths, and the domain weights may be included in metadata tags associated with each of the objects. Any other information about the objects can also be stored via the metadata tags associated with each of the objects. The one or more objects are discussed in further detail in association with FIG. 2.

A filtering engine 110 may be coupled to the object relevance search engine 108 and/or the network 108, and be configured to filter the search results based on the preliminary relevance, overall relevance, metadata, and so forth. By filtering the search results, the user can better navigate the search results that are returned. For example, in the corporate governance query scenario, the user making the query may want to filter the search results in order to obtain results for people who work only in a corporate practice group in a specific office location. Because the preliminary relevance of the one or more objects may be utilized to filter the search results, the user can access detailed search results based on specific filtering terms. The filtering engine 110 may also dynamically derive the filters, and generate search results based on alternative and/or additional specific filtering terms. In exemplary embodiments, the derivation of filters may be based on the preliminary relevance.

While the filtering engine 110 is shown coupled to the object relevance search engine 108, in alternative embodiments, the functions of the filtering engine 110 may be comprised within the object relevance search engine 108, or filtering engine 110 may be a module of the object relevance search engine 108. Filtering will be discussed in more detail in connection with FIG. 3*a*-FIG. 3*b*.

Figure 2:
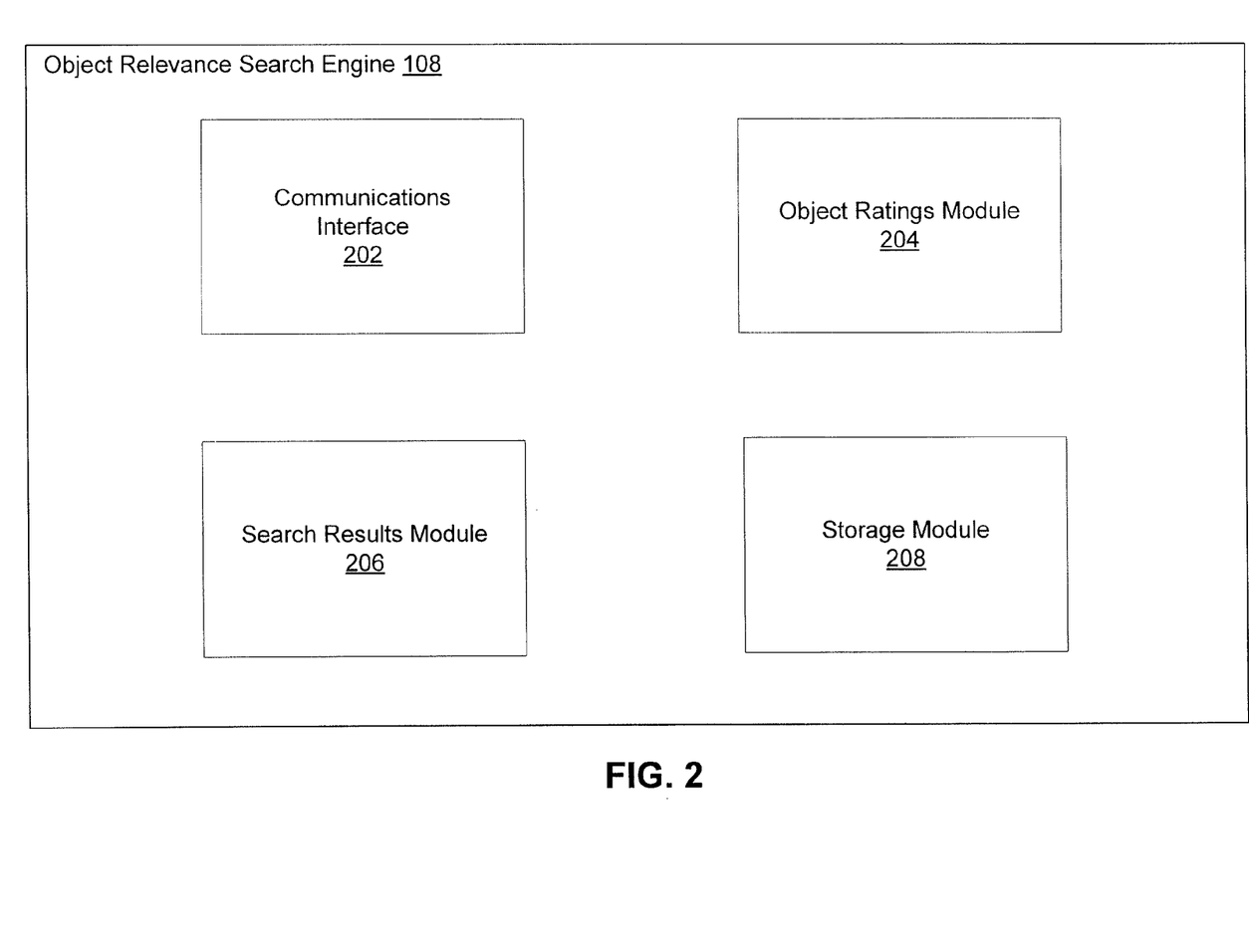
FIG. 2 illustrates a block diagram of an exemplary object relevance search engine.

FIG. 2 illustrates a block diagram of an exemplary object relevance search engine, such as the object relevance search engine 108 discussed in FIG. 1. A communications interface 202 may be associated with the object relevance search engine 108 for facilitating communications between the users 102 and the object relevance search engine 108. For example, the communications interface 202 may be utilized to receive information from the users 102 and send information, such as search results, to the users 102. User A 102A can enter query terms into a search page (not shown) displayed by the object relevance search engine 108, for example. The communications interface 202 receives the query terms and forwards the query terms to other modules to process the query terms and generate search results. The communications interface 202 can then return the search results to the user A 102A.

Any type of communications interface 202 may be provided. Further, the object relevance search engine 108 can provide any type of interface, search page, input medium, and so forth for receiving the query terms from the users 102.

A ratings module 204 may also be associated with the object relevance search engine 108. The ratings module 204 can determine a preliminary relevance for the objects based on the query terms received via the communications interface 202. The ratings module 204 can also establish an overall relevance for the objects based on propagating relevancies among the objects, adjusting the relevancy weights and/or ratings for the objects, assigning connection strengths to the relationships (e.g., transitive properties) between the objects, and/or assigning domain weights to the objects.

For example, in response to the query terms "patent infringement," the ratings module 204 can search for objects that include patent infringement in text associated with the objects or in metadata tags associated with the objects. As discussed herein, the objects can represent data such as documents, media, people, positions, and so forth. The ratings module 204 may identify one or more sets of objects that are pertinent to the query terms "patent infringement." A preliminary relevance may then be assigned to each of the objects within the one or more sets.

The ratings module 204 may then identify other objects that have relationships with the one or more sets of objects. For example, the other objects may be related to the one or more sets of objects based on commonalities, such as common authors, common billing matters, similar subject matter, and so forth. The ratings module 204 may assign relevancies to the other objects based on the relationships. The relevancies of the other objects may be less, similar, or more than the relevancies of the one or more sets of objects to which the other objects are related. The ratings module 204 can then assign connection strengths to the relationships between the objects. For example, an "object A" may be more strongly connected with an "object B" than with an "object C."

Domain weights may also be assigned by the ratings module 204. For example, the "object A" may belong to one or more virtual domains. Depending upon how pertinent the virtual domains are to the query terms, or other search variables, the "object A" may be assigned a weight for each of the virtual domains or for the virtual domains to which the "object A" belongs, as a whole. For example, if the "object A" belongs to the "patent department domain", the "object A" may receive a higher weight than if the "object A" belongs to the "asbestos litigation department."

The ratings module 204 may then assign an overall relevance for each of the objects based on the preliminary relevance, propagated relevancies, the connection strengths, and the domain weights. The overall relevance for each of the objects may comprise a rating system, weights, or any other system for identifying different relevancies between the objects that represent the data associated with the enterprise system 106. In some embodiments, the ratings module 204 may determine an overall relevance with respect to each of a plurality of filters that are available to a user.

A search results module 206 can utilize the overall relevance to generate search results to return to the user 102. For example, the overall relevance may be utilized to rank or order the objects to return data associated with the objects to the user 102 as the search results. The search results module 206 may also categorize the objects according to one or more categories, such as data associated with the objects for a people category, a matter category, a document category, and so forth. Any category may be identified by the search results module 206.

According to exemplary embodiments, the search results module 206 can also modify the search results based on further query terms entered by the user 102. For example, the user 102 may provide further query terms to narrow the search results. The search results module 206 may utilize the overall relevance to re-rank the objects. Alternatively, the search results module 206 can obtain new preliminary relevance and/or new overall relevance from the ratings module 204 based on the further query terms from the user 102.

A storage module 208 may be associated with the object relevance search engine 108. The storage module 208 can store or direct storage of the objects, the metadata associated with the objects, and/or the ratings associated with the objects. A database or other information repository may be coupled to the enterprise system 106 and/or the object relevance search engine 108 for storing the data and/or the objects that represent the data. For example, a database may be utilized to store the relationships between the objects and the data that each of the objects represents. The filtering engine 110 may access the storage module 208 to provide dynamic search results based on a filter selected by the user 102. In some embodiments, the filters are also dynamically generated and presented to the user by the filtering engine 110.

Although FIG. 2 shows the exemplary object relevance search engine 108 as being comprised of various modules, such as the communications interface 202, the object ratings module 204, the search results module 206, and the storage module 208, fewer or more modules may comprise the object relevance search engine 108 and still fall within the scope of various embodiments. For example, a search result filtering module (not shown) may be utilized to filter the search results based on the preliminary relevance, overall relevance, metadata, and so forth.

FIG. 3*a* illustrates a screen shot of an exemplary search results page 300. The query terms "motion to compel arbitration" has been input into the search system via a search box (not shown). A confirmation of the entered query term is provided in a search confirmation field 302.

Once the search term is received from the user 102, the object relevance search engine 108 (e.g., the search results module 206 associated with the object relevance search engine 108) locates the one or more objects that represent data that is appropriate based on the query terms.

As discussed herein, the ratings module 204 can utilize the query terms to determine the preliminary relevance of the one or more objects that represent the data associated with the enterprise system 106. In some embodiments, the preliminary relevance may be propagated between the one or more objects. The ratings module 204 can also establish an overall relevance. The search results module 206 may then utilize the overall relevance to present and organize search results 306 to return to the user 102. For example, the objects with the highest overall relevancy may then be deemed to be the best search results to present to the user 102.

The search results 306 are displayed on the result page 300 in FIG. 3a with links to the documents, matters, people, and so forth described in the search results 306. Any number of search results 306 may be displayed in response to the query.

In FIG. 3a, for example, the ratings module 204 utilizes the terms "motion to compel arbitration" to compute relevancy of the objects based on the actual terms "motion to compel arbitration," on metadata associated with the terms "motion to compel arbitration," and/or on metadata generated as a result of propagating relevancies between the objects. The search results module 206 may return the search results 306 for any and all categories, such as documents, people, and matters, as discussed herein. For example, in FIG. 3a, tabs 308 for various categories are illustrated.

The tabs 308 near a top of the result page 300 allow the user 102 to display the search results 306 according to the various categories (e.g., documents, people, and matters). The categories may correlate with virtual domains according to some embodiments. Any type of categories and/or the tabs 308 may be provided according to some embodiments. In some embodiments, the tabs 308 may include the categories and a number associated with each category for indicating the number of hits or the number of the search results 306 corresponding with each category.

The data displayed as part of the search results 306 in FIG. 3a may be accessed by clicking on a title associated with the data, or by any other mechanism. A document snapshot page, for example, may be accessed by clicking on the title of the documents, or other data, that comprise the search results 306. Any type of data may be provided via the enterprise system 106, as discussed herein, such as press releases, articles, and so forth. Any type of details about the data, such as people, websites, subject matter, and so forth may be displayed by accessing the data displayed via the search results page 300.

A snapshot of a person associated with the data may be displayed by accessing the tabs 308 for the category entitled "people", for example. A snapshot of the person may include any type of data about a person associated with the data. For example, a photograph and biographical data about the person in the snapshot may be displayed. Other data, such as the office location, phone number, email address, languages spoken, hire date, or any other data may also be displayed, according to exemplary embodiments.

Matter snapshots may also be displayed by accessing the tabs 308 for the category entitled "matters," for example. The matter snapshots can include any information about a client matter associated with the search results 306, a listing of the client matters related to the search terms "notice to compel arbitration", a listing of hours billed towards specific matters, industry, total hours billed, responsible attorney, date the matter was opened, other documents related to the matter, and so forth.

By utilizing metadata from various areas, such as accounting, management, client, matters, practice areas, customer relationship management data, support libraries, and so forth, along with the query terms, the search results 306 can be provided that indicate relationships, relevancies, and so forth that may not be revealed by a standard key word search. Thus, a responsible attorney for a patent infringement opinion may not be identified via a standard key word search since the words "motion to compel arbitration" may not appear within the object created for the responsible attorney. However, because billing records and other attorney records indicate that the responsible attorney worked on matters concerning a motion to compel, the responsible attorney may comprise part of the search results 306 returned to the user 102 in response to a "motion to compel arbitration" search request.

A filter results field 310 is also included on the search results page 300. The filter results field 310 may be utilized for filtering the displayed results. In FIG. 3a, the user 102 may select a filter 312 by choosing one of the listed filters 312 of the filter results field 310. In alternative embodiments, the filter 312 may be selected via other mechanisms such as from a drop down menu or entering a filter term in a filter box (not shown). Any type of filter 312 may be utilized for refining the search results 306 according to various embodiments. Furthermore, the filter results field 310 may comprise any number of filters 312, and should not be limited to those shown in FIG. 3a.

Referring now to FIG. 3b, the search results page 300 is shown with a filter selection window 314 displayed. In some embodiments, when the user 102 selects one of the filters 312 (e.g. "Author's Group") of the filter results field 310 the filter selection window 314 is provided. The exemplary filter selection window 314 provides a listing of filter groups 316 within each filter 312, which the user 102 may select from in order to narrow the search results 306.

In the present example, the "Author's Group" filter 312 is selected by the user 102. As a result, a filter selection window 314 comprising a listing of available author filter groups 316 is provided. In the present example, the filter group 316 includes departments (e.g., Litigation, Corporate, Healthcare & Life Sciences, etc.) and people (e.g., Secretaries—Other Legal). Other forms of filter groups 316 may be utilized as determined by the filter 312.

In exemplary embodiments, a filter result number 318 is provided next to each filter group 316. The filter result number 318 represents a number of search results within the filter group 318. Thus, for example, the "Corporate" filter group 316 has 669 search results. As such, the use of filters provides a dynamic search result display. In some embodiments, the dynamic search result display includes result objects from other domains that are most relevant.

When the user 102 selects one of the filters groups 316, a filtered search result page 320 is provided, as shown in FIG. 3c. In the present example, the user 102 selected the "Healthcare & Life Sciences" filter group 316. A confirmation of the selected filter group 316 may be provided in a filter confirmation field 322. In some embodiments, the filtering engine 110 determines which filters are relevant to a property of the objects corresponding to the query. The filters may be created dynamically in response to the query. For example, a query may return a list of documents each associated with a property "author" which has a value, term, or metadata that indicates a specific person. The filtering engine 110 may access a record associated with the specific person and/or determine whether data or other properties about that person such as group, office, role, or department, is relevant to the query.

To construct the filter based on this determination, the properties of the objects may be propagated to determine whether objects in another domain are relevant to the query. To continue the above example, if the property "group" is relevant, the group associated with the specific people named as the authors of the documents may be propagated across other domains such as matters. This propagation may result in additional people who may be relevant to the query because the person has worked on similar matters.

If the search results are displayed according to a filter, keywords used in the query may be highlighted in the results. Thus, the search results are dynamically generated and presented to the user 102. The user 102 may additionally or alternatively specify properties to be highlighted.

Although FIGS. 1-3c discussed herein refer to attorneys and attorney matters, providing data based on object relevance and filtering in the enterprise system 106 may be utilized for any search system. For example, accountants, doctors, and so forth may utilize the cross domain relevance for locating documents, people, matters, projects, and so on related to their businesses.

Figure 4:
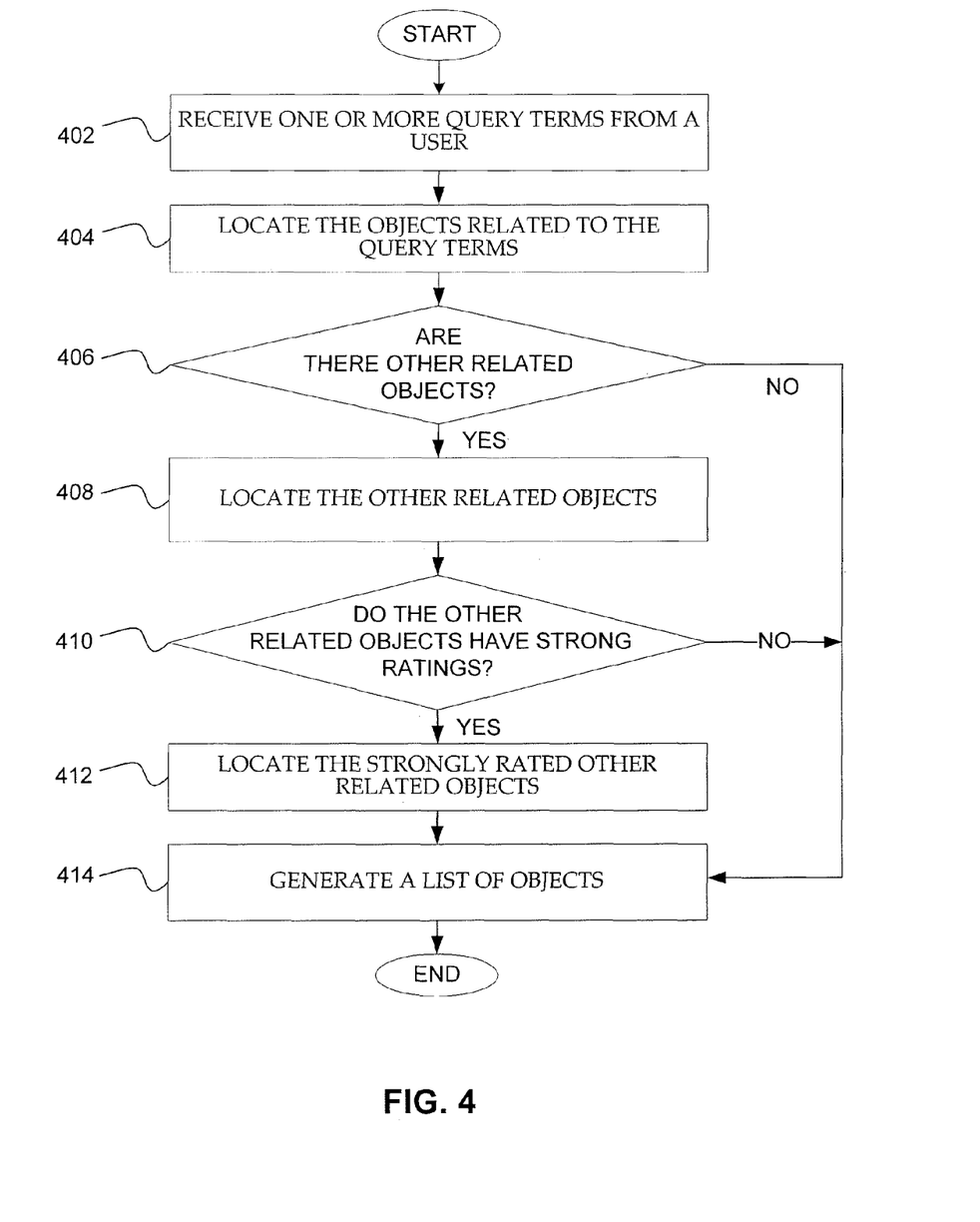
FIG. 4 illustrates a flow diagram of an exemplary process for generating objects in response to a query.

FIG. 4 illustrates a flow diagram of an exemplary process for generating and providing objects in response to a query. At step 402, one or more query terms are received from the user 102, such as via the communications interface 202, discussed herein.

At step 404, the objects related to the query terms are located. Locating the objects may include assigning the objects to the data associated with the enterprise system 106. In other words, the objects may have been assigned to the data previously or in response to the query terms received from the user. The objects that are pertinent to the query terms may then be located. For example, the storage module 208 may identify the objects in storage, databases, and so forth. As discussed herein, the objects may be located based on a preliminary relevance determined by the ratings module 204 or by any other method.

At step 406, it is determined whether other related objects exist. For example, the ratings module 204 may identify other objects that are related to the query terms. The ratings module 204 may identify the other related objects based on propagating the preliminary relevance, for example. If there are no other related objects, a list of the related objects located at step 404 may be generated.

If there are other related objects, the other related objects are located at step 408. Locating the other related objects may include generating the other related objects based on propagating relevancies, connection strengths, and/or domain weights, for example.

At step 410, it is determined whether the other related objects have strong ratings. Any type of method or process may be utilized to determine whether the ratings for the other related objects are strong. For example, the objects located at step 404 and the other related objects located at step 408 may be assigned ratings comprising overall relevancies, rankings, weights, scores, and/or any other measurement. The objects may be compared to determine which of the objects have the highest ratings. As discussed herein, the propagated relevancies, the connection strengths, and the domain weights for the other related objects may be utilized to determine which of the other related objects are strong as compared with one another.

If none of the other related objects have strong ratings, a list of the related objects may be generated in later steps. The list may include the objects from step 404 and/or some of the objects from step 408.

If the other related objects have strong ratings, the strongly rated objects are located at step 412. For example, the strongly rated objects may be separated from the other related objects and identified to become part of a list to present to the user 102 as part of the search results, such as the search results 306 discussed herein.

At step 414, a list of all the related objects is generated. The list may comprise the related objects from step 404, the other related objects from step 408, and/or the strongly rated objects from step 412. According to some embodiments, all of the objects that are related to the query terms, via text within the objects or metadata associated with the objects, such as ratings, may be combined and ranked in a list. The top ten objects, for example, may be selected from the list to generate the search results 306.

Figure 5:
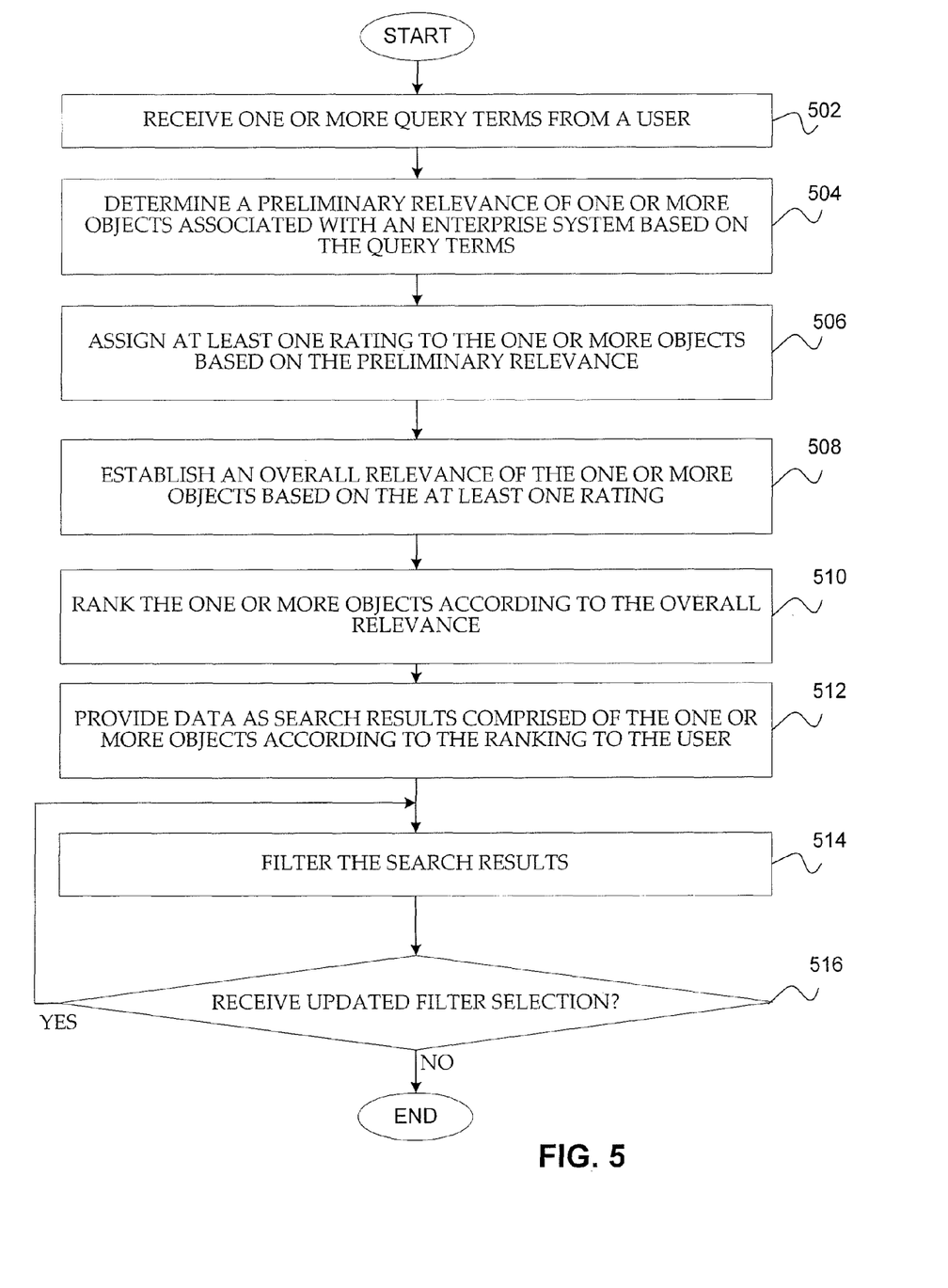
FIG. 5 illustrates a flow diagram of an exemplary process for providing data based on object relevance.

FIG. 5 illustrates a flow diagram of an exemplary process for providing information navigation and filtration. As discussed herein, the search results may be filtered by the filtering engine 110.

At step 502, one or more query terms are received from a user, such as the user A 102A through the user N 102N discussed herein. The query terms may be received via a search page or search interface, entered into a search box, and so forth. Any type of medium or interface for entering query terms may be provided.

The communications interface 202 receives the query terms from the user 102, either directly or via the enterprise system 106. As discussed herein, the enterprise system 106 may provide a search interface according to some embodiments.

At step 504, a preliminary relevance of one or more objects associated with an enterprise system is determined based on the query terms. The communications interface 202 can forward the query terms to the ratings module 204, for example. The ratings module 204 may determine the preliminary relevance of the objects representing the data associated with the enterprise system 106 based on text associated with the objects themselves, metadata associated with the objects, or any other information associated with the objects. For example, the preliminary relevance may be determined based on the query terms that match terms within the data represented by an "object A" or terms within the metadata tag associated with the "object A." The preliminary relevancy may also be computed based on metadata inferred by the object relevance search engine 108 from the relationships between the various objects. The data and/or the objects that represent that data may be stored in databases or other information repositories by the objects storage module 208, by the enterprise system 106, or by any other device, module, or application that is responsible for storing the data and/or the objects.

Any type of terms, concepts, aspects, and/or metadata may be utilized for computing the preliminary relevance of the objects. In some embodiments, the objects may comprise terms to which probabilities are assigned. The probabilities are then utilized in computing the preliminary relevance of the objects based on the probability that the terms are relevant to the query.

In some embodiments, the preliminary relevance may be propagated between the one or more objects. For example, a first object with transitive properties shared with a third object, based on the relationship between the first object and the second object as well as the relationship between the second object and the third object, may share relevancy with the third object due to the transitive nature of the relationship. Accordingly, the preliminary relevance is propagated between the one or more objects so that inferred relationships between the various objects results in shared or distributed relevancies.

At step 506, at least one rating is assigned to the one or more objects based on the preliminary relevance. As discussed herein, the ratings module 204 may assign a rating to each of the objects based on propagation of the preliminary relevance to the objects. Each of the relevancies may have different rankings or weights. The ratings module 204 can also assign ratings comprising connection strengths between the objects and/or domain weights, as discussed herein.

At step 508, an overall relevance of the one or more objects is established based on the at least one rating. As discussed herein, the ratings module 204 may compute or otherwise establish the overall relevance based on the preliminary relevance, the propagated relevancies and/or relevancy weights, connection strengths between the objects, and/or the domain weights.

For example, a weighted sum may be utilized to establish the overall relevance of the objects. As discussed herein, the objects may also be grouped into one or more domains. In exemplary embodiments, the following algorithm may be utilized:

$$OR(o, q) = \sum_d w_d \sum_a w_a c_{oa} R(a, q)$$

In the exemplary algorithm, the index "d" runs over the various domains, and "wa" is a domain-specific weighting factor that expresses how much relevancy is contributed/propagated from each of the domains associated with the one or more objects. The object index "a" runs over the associated objects in the dimension. According to some embodiments, it is assumed that an object is associated to itself, with an association strength. "wa" is another domain specific weighting factor. The variable "$c_{ao}$" expresses the connection strength between objects "a" and "o." "q" indicates a dependency on a specific query. Thus, to compute the overall relevance for the object, the relevancies from the objects are propagated, weighted by the connection strength between the objects, and weighted by a dimension specific factor. It should be noted that the foregoing algorithm is set forth for illustrative purposes only and should not be construed to limit the various embodiments in any manner.

At step 510, the one or more objects are ranked according to the overall relevance. As discussed herein, the one or more objects may be ranked in order to present the search results, such as the search results 306 shown in FIG. 3, according to an order. For example, a first item in the search results 306 may be ranked higher than a fifth item in the search results 306. Any type of ranking may be utilized.

At step 512, data is provided as search results comprising the one or more objects according to the ranking to the user. As discussed herein, the data may be provided via a search results page, such as the search results page 300 discussed in FIG. 3a. The data may be accessible by clicking on a title associated with the data, clicking on a link to the data, or via any other mechanism.

At step 514, the search results are filtered based on the preliminary relevance associated with the one or more objects. As discussed herein, the preliminary relevance may be utilized to determine which objects are pertinent to refined search terms entered and/or a predetermined filter selected by the user 102. According to some embodiments, the user 102 may select or enter a filter 312 or filter group 316 for refining the search results 306 according to the predetermined search filter. The preliminary relevance of the objects may then be evaluated, by the object relevance search engine 108 and/or the filtering engine 110, in order to determine which of the objects comprising the search results 306 best match. In other words, the filter acts as a further query for further narrowing the search results 306.

Any type of filter may be utilized to refine the search results 306. As discussed herein, the filtering engine 110 utilizes the preliminary relevance to filter the search results 306, according to exemplary embodiments. By using the preliminary relevance to filter the search results 306; users 102 can view the search results 306 based on the relationships between the objects, rather than merely on keywords appearing within the information itself. Thus, users can access documents or information that is more useful for particular situations. For example, a user can access documents related to a specified subject matter and authored by partners in a local office, so the user can have a face to face meeting with the partner about the document.

The use of the filters also provides a dynamic search result display. In exemplary embodiments, each filter will provide a different set of search results with a different number of results within each filter category. Furthermore, the selection of a filter will, in some embodiments, cause the filtering engine 110 to generate and present search results with certain properties and terms highlighted or otherwise indicated. Thus, the search result display is dynamic based the selected filters. In operation, the user 102 may select a second filter after the search results are filtered in step 516. The updated filter selection may be selected to change the scope of the filter (e.g., result in fewer objects) or the type of filter (e.g., to search by client rather than by author). The second filter may be dynamically generated. In some embodiments, the dynamic search results include result objects from other domains that are most relevant.

As discussed herein, the data may be filtered according to one or more virtual domains. For example, the data may be filtered according to a legal department, a person, a matter number, and so forth. Any virtual domains or categories may be utilized to organize and present the data.

Metadata may be associated with the one or more objects. As discussed herein, the metadata may store the ratings, the preliminary relevance, the relationships between the objects, and/or any other information about the one or more objects. The preliminary relevance may be determined based at least in part on the metadata. For example, terms associated with the metadata may be matched with the query terms entered by the user 102, as discussed herein. The overall relevance may also be determined, based in part on the metadata.

At least one further query term from the user 102 for narrowing the search results may also be received. As discussed herein, the user 102 can narrow or filter the search results, such as the search results 306 described in FIG. 3, by entering further query terms, by entering domains or categories, or by providing any other type of information for narrowing the search results 306. The search results module 206 can modify the search results based on the further query terms entered and/or the search results module 206 may generate new search results based on new preliminary relevance and/or new overall relevance from the ratings module, for example.

While various embodiments have been described above, it should be understood that they have been presented by way of example only, and not limitation. For example, any of the elements associated with the object relevance search engine 108 may employ any of the desired functionality set forth hereinabove. Thus, the breadth and scope of a preferred embodiment should not be limited by any of the above-described exemplary embodiments.

What is claimed is:

1. A method for providing data based on object relevance via at least one computing device, comprising:
   receiving one or more query terms from a user via a communications interface associated with the at least one computing device; and
   executing instructions stored in memory by a processor to:
      determine a preliminary relevance of one or more objects associated with an enterprise system based on the query terms,
      assign at least one rating to the one or more objects based on the preliminary relevance,
      propogate the preliminary relevance among the one or more objects; and
      establish an overall relevance of the one or more objects based on the at least one rating, utilizing the preliminary relevance and the propogation,
      rank the one or more objects according to the overall relevance,
      provide data as search results comprising the one or more objects according to the ranking to the user,
      filter the search results based on at least one selected, dynamically generated filter associated with the one or more objects; and
      transmit to display the search results to the at least one computing device via the communications interface.

2. The method recited in claim 1, further comprising filtering the search results according to one or more virtual domains.

3. The method recited in claim 1, further comprising associating metadata with the one or more objects.

4. The method recited in claim 3, wherein the preliminary relevance is determined at least in part based on the metadata.

5. The method recited in claim 3, wherein the overall relevance is determined at least in part based on the metadata.

6. The method recited in claim 1, further comprising receiving at least one further query term from the user for narrowing the search results.

7. The method recited in claim 1, wherein filtering the search results comprises providing a dynamic search result display.

8. The method recited in claim 1, wherein filtering the search results comprises including result objects from other domains that are most relevant.

9. The method recited in claim 1, wherein filtering the search results comprises propagating the preliminary relevance between objects and inferring relationships between the objects in order to dynamically generate the filters.

10. A system for providing data based on object relevance, comprising:
    a memory to store executable instructions;
    a processor to execute the executable instructions stored in the memory, the executable instructions including:
       a communications interface to be displayed on at least one computing device, the communications interface configured to receive one or more query terms from a user;
       a ratings module in communication with the communications interface, the ratings module configured to determine a preliminary relevance of one or more objects associated with an enterprise system based on the query terms, to assign at least one rating to the one or more objects based on the preliminary relevance, to propogate the preliminary relevance among the one or more objects; and to establish an overall relevance of the one or more objects based on the at least one rating, utilizing the preliminary relevance and the propogation;
       a search results module in communication with the ratings module, the search results module configured to rank the one or more objects according to the overall relevance and to provide data as search results comprising the one or more objects according to the ranking to the user; and
       a filtering engine configured to filter the search results based on a selected, dynamically generated filter and to transmit to display the filtered search results to the at least one computing device via the communications interface.

11. The system recited in claim 10, wherein the filtering engine is further configured to filter the data according to one or more virtual domains.

12. The system recited in claim 10, wherein the filtering engine is further configured to generate the dynamically generated filter.

13. The system recited in claim 12, wherein dynamically generated filters are based in part on the propagation of the preliminary relevance between objects.

14. The system recited in claim 10, wherein the filtering engine is further configured to provide a dynamic search result based on the selected, dynamically generated filter.

15. A non-transitory computer readable storage medium having embodied thereon a program, the program being executable by a processor to perform a method for providing data based on object relevance, the method comprising:
    receiving one or more query terms from a user via a communications interface associated with at least one computing device;
    determining a preliminary relevance of one or more objects associated with an enterprise system based on the query terms;
    assigning at least one rating to the one or more objects based on the preliminary relevance;
    propogating the preliminary relevance among the one or more objects;
    establishing an overall relevance of the one or more objects based on the at least one rating, utilizing the preliminary relevance and the propogation;
    ranking the one or more objects according to the overall relevance;
    providing data as search results comprised of the one or more objects according to the ranking to the user;
    filtering the search results based on at least one selected, dynamically generated filter associated with the one or more objects; and
    transmit to display the search results to the user via the at least one computing device.

16. The computer readable storage medium recited in claim 15, further comprising filtering the data according to one or more virtual domains.

17. The computer readable storage medium recited in claim 15, further comprising associating metadata with the one or more objects.

18. The computer readable storage medium recited in claim 17, wherein the preliminary relevance is determined at least in part based on the metadata.

19. The computer readable storage medium recited in claim 17, wherein the overall relevance is determined at least in part based on the metadata.

20. The computer readable storage medium recited in claim 15, further comprising receiving at least one further query term from the user for narrowing the search results.

* * * * *